United States Patent Office.

LUDWIG FROMM, OF KÖTZSCHENBRODA, GERMANY.

METHOD OF PRESERVING FARINACEOUS PRODUCTS.

SPECIFICATION forming part of Letters Patent No. 496,780, dated May 2, 1893.

Application filed January 9, 1893. Serial No. 457,747. (No specimens.)

*To all whom it may concern:*

Be it known that I, LUDWIG FROMM, a subject of the Emperor of Germany, residing at Kötzschenbroda, in the Empire of Germany, have invented a certain new and useful Method of Preserving Farinaceous Products, of which the following is a specification.

This invention relates to a method of preserving flour and farinaceous products, and consists in the admixture to the substance to be preserved of a powder or "flour" of hazel-nuts. This method of preservation will prove of great value when used in storing up any kind of flour or kindred substances, and also baked goods, such as rusks or biscuits used in the army and navy; and it will also apply in the case of vegetable or leguminous conserves, such as tinned vegetables, soup-tablets, peas-pudding, and the like. In preparing the hazel-nut flour, the kernels are first removed from the shells, and then (preferably after being roasted) are ground or reduced to powder; only the white substance of the kernel however is ground. This powder or flour is added to the goods to be preserved,—cereals, pulse, or the like,—in a proportion varying between five and twenty-five per cent., care being taken that the mixture is as thorough as possible, as it is important that the fatty element of the powdered hazel-nuts shall pervade or permeate the whole of the substance. This fat does not become rancid and at the same time acts as a deterrent against insects or caterpillars. The flour so mixed acquires, moreover, a property which enables the bread or other goods made of it to keep much longer than similar goods made of ordinary flour, the fatty or oily element preventing the absorption of moisture to a great extent, and consequently the formation of mold, mildew or similar growths. Besides, the great quantities of albumen and fat contained in the hazel-nut pulp enhance the value of the flour or other product as such; as nutritious substances, however good in themselves will only be fully taken advantage of by the constitution of the body if the albumen and fat they contain are in the normal proportion to the hydrates of carbon.

I claim—

1. The herein described method of preserving or refining flour and other farinaceous and vegetable products which consists in adding thereto hazel-nut flour.

2. As a new article of manufacture, flour and other farinaceous or vegetable products mixed with hazel-nut flour.

In testimony thereof I have hereunto set my hand in the presence of two witnesses.

LUDWIG FROMM.

Witnesses:
RUD. SCHMIDT,
HERNANDO DE SOTO.